Figure 1:
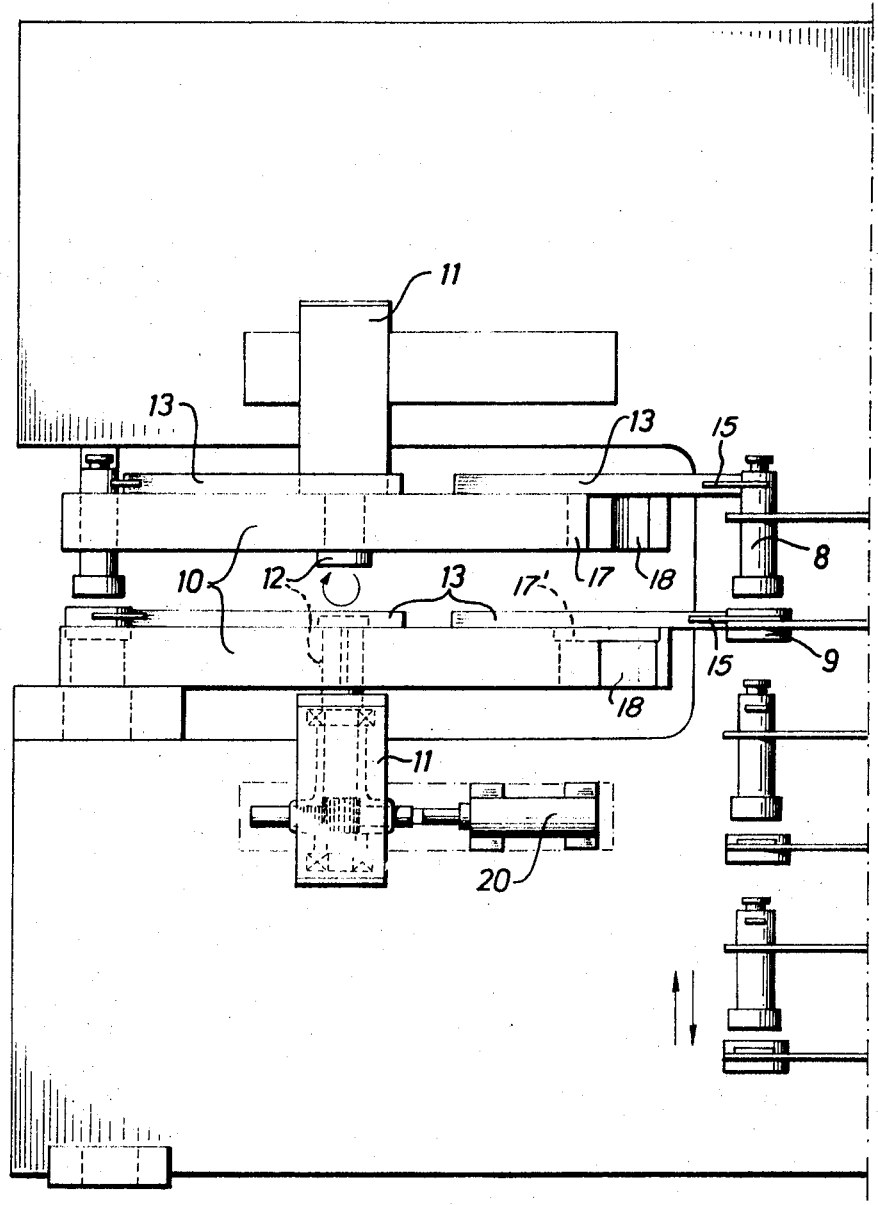

United States Patent [19]

Kristiansson

[11] 3,745,646
[45] July 17, 1973

[54] ARRANGEMENT IN TOOL CHANGES FOR STAMPING AND NIBBLING MACHINES AND THE LIKE

[75] Inventor: Erik Kristiansson, Partille, Sweden

[73] Assignee: Pullmax Aktiebolag, Gothenburgh, Sweden

[22] Filed: Oct. 7, 1970

[21] Appl. No.: 78,691

[52] U.S. Cl. .................................. 29/568, 72/446
[51] Int. Cl. ............................................. B23q 3/155
[58] Field of Search ........................... 29/568, 26 A; 72/446, 447, 448

[56] References Cited
UNITED STATES PATENTS

| | | | |
|---|---|---|---|
| 3,234,648 | 2/1966 | Knowles | 29/568 |
| 3,157,283 | 11/1964 | Maas et al. | 29/568 X |
| 3,628,231 | 12/1971 | Pancook | 29/568 X |
| 3,590,470 | 6/1971 | Brainard | 29/568 |

*Primary Examiner*—Andrew R. Juhasz
*Assistant Examiner*—Z. R. Bilinsky
*Attorney*—Hill, Sherman, Meroni, Gross & Simpson

[57] ABSTRACT

The present invention provides an automatic retooling means in machines working with two cooperating tools such as stamping, nibbling and like machines. The automatic retooling means provide for the transfer and return of pairs of tools from a magazine to their working position in a machine. The automatic retooling means include a plurality of superposed pairs of turret head plates to carry respective cooperating pairs of tools in the magazine in positions relative to their corresponding working position, and two parallel and simultaneously operating tool changing means arranged for transporting and returning the respective tools from the magazine to their working position in the machine.

8 Claims, 3 Drawing Figures

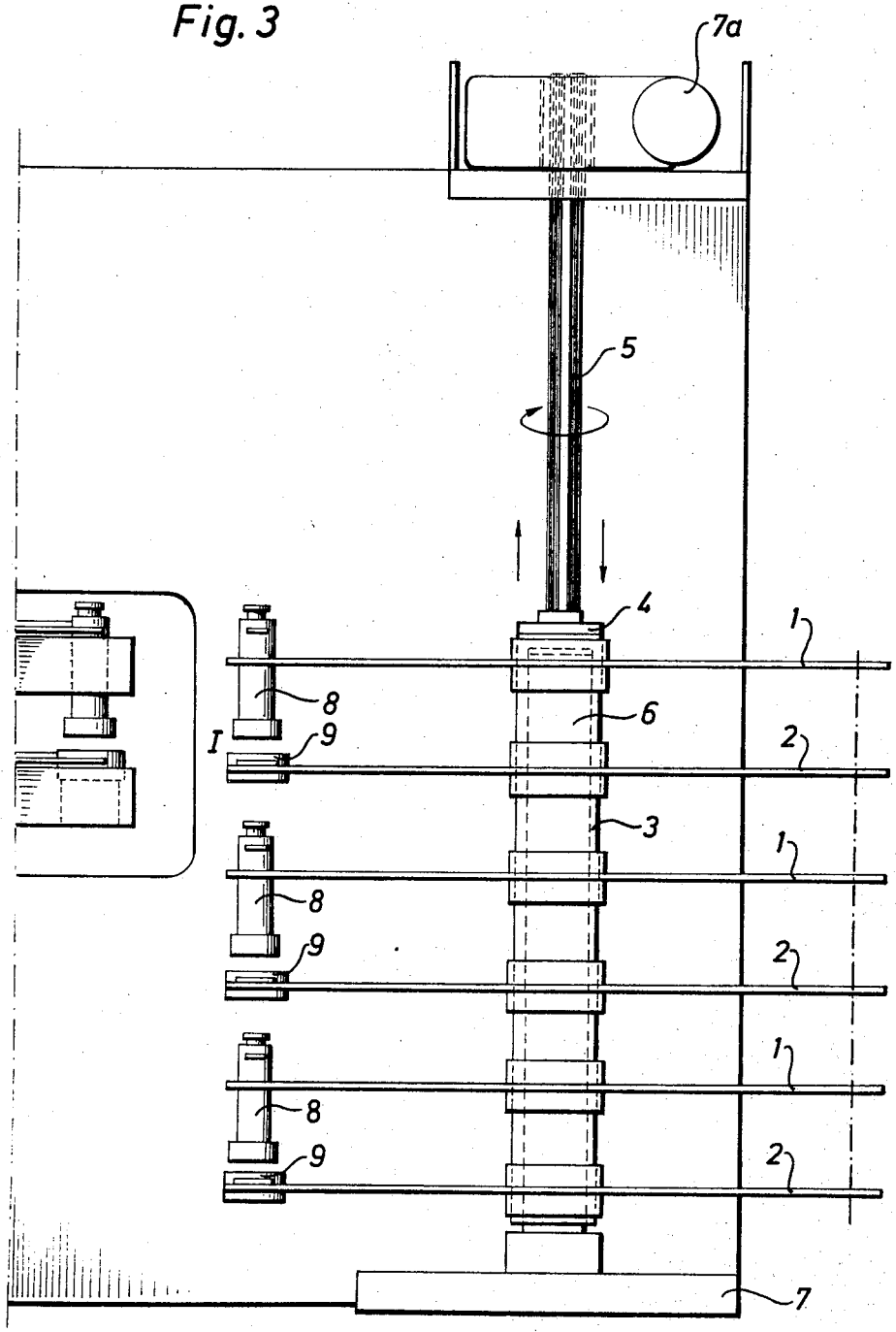

ARRANGEMENT IN TOOL CHANGES FOR STAMPING AND NIBBLING MACHINES AND THE LIKE

The present invention refers to an arrangement in tool changes for stamping and nibbling machines and the like.

When making recesses, notches, holes etc. in thin sheet metal in the manufacture of apparatus constructional elements for example, the work is usually effected with stamping or nibbling machines. Of these, the stamping machine is the most productive and gives the best result, since the resulting cut surfaces fulfill the high requirements placed on surface smoothness. On the other hand, nibbling machines can be used when the length of the cut to be made is too large for stamping or when the curvature of the cut is complicated or if the number of notches, recesses, curved profiles etc. to be made occur too seldom to make stamping an economically worthwhile alternative. The most suitable machine for use in the present connection is therefore one which can be used for both stamping and nibbling.

Combined stamping and nibbling machines commercially available at present are characterized in that the change over from one tool to another must be made manually. It is true that with the aid of certain devices retooling can be effected relatively quickly, but this does not eliminate the necessity of having a machine operator in attendance. Another disadvantage is that the machine operations can not be automated in a purposeful manner, e.g. by numerical control. Machines used solely for stamping and with the mechanized tool changing have long been known to the art. These machines are normally constructed with a C-type or portal-type stand, in which two plates disposed one above the other and rotatable about a common rotation shaft, so-called turret or revolving heads, are arranged. The upper and lower portions of the punches are attached to the periphery of the turret heads. The turret heads can be rotated by means of special indexing mechanisms and locked in position when the correct tool is located beneath the hammer of the machine.

This type of retooling device has practical limitations, however. Because the turret heads are without exception always placed inside the impact-load absorbing stand, the number of tool stations is restricted, among other things since an excessively large number of tools would result in a stand of unreasonable dimensions. That this must be the case will readily be perceived when it is remembered that the moment of inertia of the stand beams must increase by a third power in relation to the throat depth, presuming that the same static stiffness is to be maintained at a given punching force. Furthermore, in order that the turret heads can be utilized to a maximum, the heads are designed for a specific number of tools within each range of sizes, which means that indexing can not be effected between equal pitch angles. It is obvious that this greatly restricts selectivity with regard to the assortment of tools which may be used. A further limiting factor prevailing in retooling structures of this type is that tools can only be moved to their working position while the machine is stationary. Owing to the fact that the punching or stamping unit and tool turret heads must alternately await each other, the machine as a whole operates relatively slowly with respect to the production rate.

The present invention relates to an automatic retooling means for stamping machines or combined stamping and nibbling machines which eliminates the aforementioned limitations.

Figure 2:
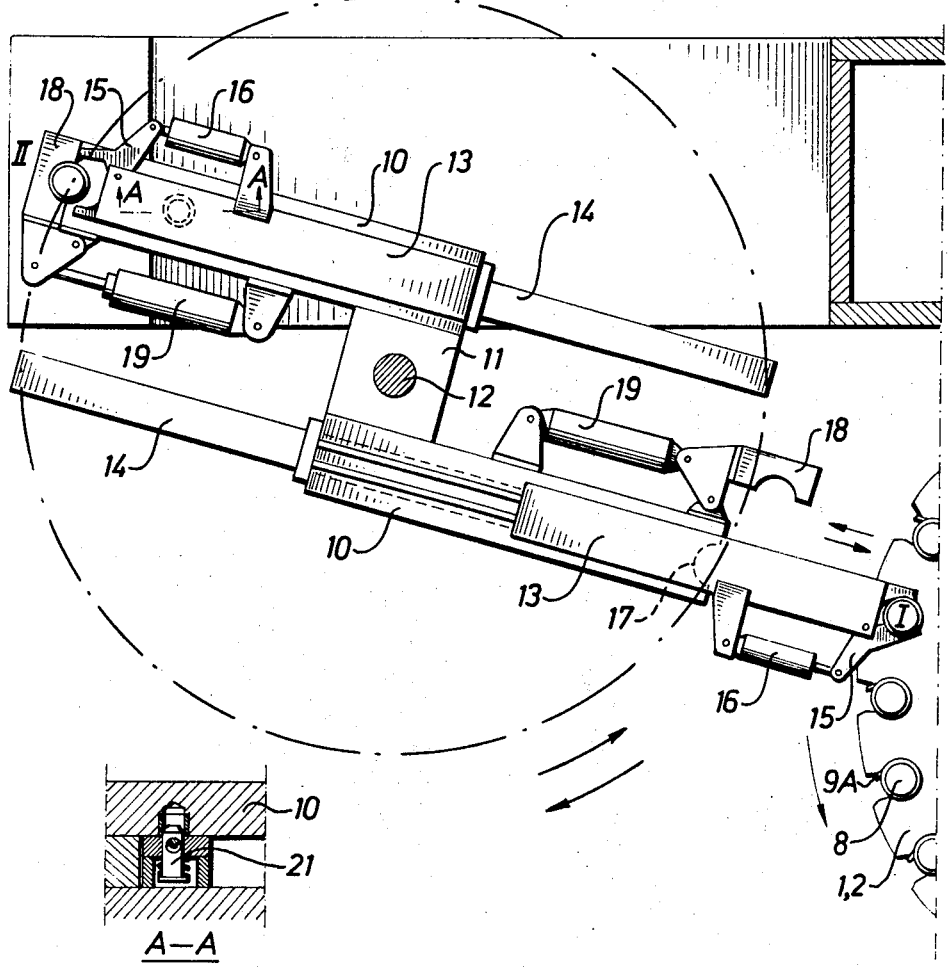

The invention will now be described in more detail with reference to the accompanying drawings, which diagrammatically illustrate an embodiment of the invention. In the drawings, FIG. 1 illustrates in side view the front portion of a machine and a tool turret drive means. FIG. 2 is a top plan view of the tool turret structure. FIG. 3 illustrates the rear portion of the machine with the tool magazine seen from the side.

Positioned adjacent the working machine is a turret-type tool magazine. The magazine comprises an optional number of pairs of circular plates 1 and 2 secured to a common hub 3. The hub is in the form of a cylinder, which is connected at its upper end with a splined shaft 5, via a cap 4. At the foot 7 of the magazine is secured a spindle 6, on which the hub 3 can be moved axially with a sliding fit. The length of the spindle is adjusted to the length of the hub. The magazine can be raised and lowered vertically, by introducing a pressure medium between the cap 4 and the spindle 6. This movement of the magazine can also be effected, however, by other means, such as worms, link systems and the like. In addition, the tool magazine can be rotated and stopped in any desired angular position, by means of a drive assembly 7a.

The circular plates are provided at the periphery thereof with recesses in the form of grooves, in which the upper portions 8 and lower portions 9 of the punching tools can be radially inserted. All upper portions 8 (punches) have the same dimensions as the attachments. This is also true for the lower portions 9 (the dies). A simple spring mechanism 9a prevents the tool portions from accidentally sliding out of the magazine as it rotates. The pairs of circular plates may also be provided with raised members or similar means for ensuring correct positioning of said plates.

The tool turret structure comprises two superposed similar units located on one side of the working machine, above and below the stand throat. Each turret unit comprises two opposing slide systems 10 mounted on a common hub 11. The tool turret heads can be rotated about the shafts 12. Running on each slide is a shuttle 13, radially maneuvered for example, by the hydraulic or compressed air cylinder 14. At the outer end of each top turret shuttle 13 is mounted a swinging grip claw 15 adapted for gripping the upper portion 8, the punch, of the punching tool. At the outer end of each lower turret shuttle 13 is mounted a similar swinging grip claw 15' adapted for gripping the lower portion 9, the die, of the tool. The gripping claws have operating means 16. The top turret slides 10 are provided at their outer ends with recesses 17, recess gripping means 18 and operating means 19 for receiving the punch 8 in a sliding fit within said recesses. The lower turret slides 10 are provided at their outer ends with recesses 17', recess gripping means 18' and similar operating means 19 for stationarily receiving the die 9 in axial alignment with punch 8. The turret heads can be rotated through 180° in a swinging movement by drive means 20. The rest position of the turrets is shown in FIG. 2. The rotary movement of the turret heads is restricted by means of dirigible locking pistons 21, which are secured to the machine stand and passed into position-fixing holes in engaging slides 10. The tool changing means operates in the following manner:

The tool magazine is assumed to be completely or partly full of assembled and pre-set punching tools for cutting contours with varying dimensions. When the working sequence is started, the magazine is rotated — and, if required, lifted — so that the correct tool is moved to position I. The rearwardly directed shuttles 13 on the upper and lower turret heads project out towards the tool magazine and, by means of the claws 15, 15' grip at both the same time the tool punch and die positioned in the magazine. The shuttles are then returned to their starting position, transporting the tool portions into abutment with the cup-shaped recess 17 of the slides. The gripping means 18 are then closed and complement with recess 17 the bearing positions for the shank of punch 8 in a manner whereby an accurate sliding fit is obtained therewith. Similarly the gripping means 18' close around the die 9 for receiving the die in a stationary position relative to punch 8. The upper and lower turret edges are then rotated through 180° around the shafts 12. The punch and die so received are then transferred to position II (FIG. 2) — the working position — and at the same time passes into engagement with the rectilinear, oscillating upper tool attachment of the working machine and with its stationary die holder. The locking pistons 21 then engage the position-fixing holes to provide an exact, mutual positional setting of the upper and lower tool portions. The gripping means 15 then open and release the movable tool portions. The workpiece is then placed in position, and the stamping operation is carried out with the turret head as a tool guide. The opposing turret head slide has, in the meanwhile, been turned rearwardly. If the slide has a tool mounted therein, the tool is released, owing to the fact that the gripping means 18 opens and the shuttle 13 projects out and places the tool in the desired recess in the tool magazine. The gripping means 15 releases its hold, whereafter the shuttle returns. The magazine then places a new tool in position I and the sequence of operations is then fully repeated.

As will be evident from the foregoing, the present invention constitutes a considerable advance when compared with the present state of the art. Because the tool magazine is placed alongside the working machine, the machine stand can be dimensioned quite independently of the number of tools desired. Tool selection is quite arbitrary, while retooling can be effected very rapidly, owing to the fact that the tool magazine can position the tool needed for the next machining operation in a state of readiness while the working machine continues to operate. A working machine equipped with the aforedescribed tool changing device can also be controlled to advantage by means of an appropriate, separate control system, for example a numerical control system.

I claim:

1. A punch press comprising:
   a. a working station including a ram and a bolster adapted to engage coactive punch and die tooling;
   b. a movable storage magazine receptive of coactive punch and die tooling;
   c. a pair of tool transfer arms disposed between said working station and said storage magazine and rotatable about a vertical axis with an end of each arm thus movable between a position adjacent to said magazine and a position where said end is aligned with said ram and bolster; and
   d. means on each said arm for engaging with the tooling, said arms holding the tooling in coactive alignment during punching.

2. A punch press according to claim 1 in which said engaging means comprises: extendible tool gripping means carried on said arm, and fixed tool clamping means at said end of said arm, said tool gripping means being operable for gripping and releasing the tooling in said magazine when extended, and for retractingly moving the tooling to said clamping means on said arm for punching.

3. A punch press according to claim 1 in which said storage magazine is rotatable about a vertical axis, said magazine having radially opening peripheral slots receptive of the tooling.

4. A punch press according to claim 3 in which said storage magazine has a plurality of axially spaced sets of said peripheral slots, and means for shifting said magazine axially to align a selected group of peripheral slots with said arms.

5. An automatic retooling means in machines working with two cooperating tools such as stamping, nibbling and like machines, the tools being transferred by means of tool change over means from a turret-type magazine arranged in connection with the machine to a working position in said machine, said retooling means comprising a plurality of superposed pairs of turret head plates arranged to carry respective cooperating pairs of tools in the magazine in positions relative to their corresponding working position, and two parallel and simultaneously operating tool changing means being arranged for transporting the respective tools from the magazine to the working position and vice versa, said turret head plates being arranged to be commonly rotated and moved in the direction of their axis of rotation to move the respective cooperating pairs of tools to determined positions to be gripped by the tool changing means and being fixed to a hub having the form of a cylinder and in which a piston is slidably accommodated, the piston being stationary and the hub capable of being moved axially in relation to the piston by introducing pressure medium above the piston to place axially respective pairs of tools in gripping positions.

6. A means according to claim 5, wherein the tool magazine constructed of said turret head plates is arranged to place the tool pair for the next following working operating in gripping position whilst a working operation is taking place in the machine.

7. A means according to claim 5, wherein the tool changing means is arranged to accommodate the gripped tools in guides which serve as guides for the tools during their working period in the machine.

8. A means according to claim 7, wherein the tool changing means is provided with guide means for aligning and fixing the cooperating tool pair in working position.

* * * * *